(12) United States Patent
Hayes et al.

(10) Patent No.: US 11,175,893 B2
(45) Date of Patent: Nov. 16, 2021

(54) STATISTICAL OBJECT GENERATOR

(71) Applicant: Blue Armor Technologies, LLC, Houston, TX (US)

(72) Inventors: John William Hayes, Reno, NV (US); Whitfield Diffie, Woodside, CA (US); Charles Andrew Gram, Reno, NV (US)

(73) Assignee: Blue ArmorTechnologies, LLC, Houston, TX (US)

( * ) Notice: Subject to any disclaimer, the term of this patent is extended or adjusted under 35 U.S.C. 154(b) by 182 days.

(21) Appl. No.: 15/732,282

(22) Filed: Oct. 17, 2017

(65) Prior Publication Data

US 2019/0114146 A1 Apr. 18, 2019

(51) Int. Cl.
*G06F 21/00* (2013.01)
*G06F 7/76* (2006.01)
*G06F 7/58* (2006.01)
*G06F 7/02* (2006.01)

(52) U.S. Cl.
CPC .............. *G06F 7/764* (2013.01); *G06F 7/026* (2013.01); *G06F 7/582* (2013.01)

(58) Field of Classification Search
None
See application file for complete search history.

(56) References Cited

U.S. PATENT DOCUMENTS

| | | | | |
|---|---|---|---|---|
| 8,539,009 B2* | 9/2013 | Aliseychik | ............ | H04L 9/0662 707/899 |
| 8,873,750 B2* | 10/2014 | Greiner | ................ | H04L 9/0643 380/46 |
| 9,087,219 B2* | 7/2015 | Klug | ....................... | G06F 21/74 |
| 9,201,629 B2* | 12/2015 | Greiner | ................ | H04L 9/0668 |
| 2007/0230694 A1* | 10/2007 | Rose | .......................... | G06F 7/58 380/46 |
| 2007/0263861 A1* | 11/2007 | Kiyomoto | ............. | H04L 9/0668 380/46 |
| 2008/0263117 A1* | 10/2008 | Rose | ....................... | G06F 7/582 708/254 |
| 2014/0040338 A1* | 2/2014 | Van Der Sluis | ...... | H04L 9/0866 708/254 |
| 2014/0164458 A1* | 6/2014 | Tkacik | ...................... | G06F 7/58 708/250 |
| 2014/0280414 A1* | 9/2014 | Greiner | ................. | G06F 9/3001 708/254 |

* cited by examiner

*Primary Examiner* — Maung T Lwin
(74) *Attorney, Agent, or Firm* — Crain, Caton & James, P.C.; James E. Hudson, III

(57) ABSTRACT

The present invention provides methods and apparatus to generate a statistical object, the deterministic statistical representation of an original object, using a Deterministic Random Bit Generator (DRBG) (10). Multiple DRBG Statistical Object Generators (10) may be chained together to increase security by using independent security configurations (22) for each DRBG Statistical Object Generator (10).

9 Claims, 12 Drawing Sheets

Initialization vector, predefined order of first 6 cards before cut

PRIOR ART

Initialization vector, cut = 2,
Internal state (first 6 cards after cut)

PRIOR ART

Internal state after drawing 1 card

Statistical object

PRIOR ART

STATISTICAL OBJECT GENERATOR

CROSS-REFERENCE TO A RELATED U.S. PATENT APPLICATION & CLAIM FOR PRIORITY

The Present Patent Application is related to:
U.S. Pat. No. 8,572,697; U.S. patent application Ser. No. 13/987,747; and U.S. patent application Ser. No. 14/998,645.

FEDERALLY SPONSORED RESEARCH OR DEVELOPMENT

None.

FIELD OF THE INVENTION

The present invention pertains to apparatus and methods for generating a series of statistical objects from an original object. In one particular embodiment of the invention, a statistical object, which is a deterministic statistical representation of an original object, is generated using a Deterministic Random Bit Generator (DRBG) device. Multiple DRBG Statistical Object Generators may be chained together to increase security by using independent security configurations for each DRBG Statistical Object Generator.

BACKGROUND OF THE INVENTION

Cyber security, also referred to as information technology security, focuses on protecting computers, networks, programs and data from unintended or unauthorized access, change or destruction. Within cyber security, statistical objects are used to provide authenticated identity where conventional identity authentication mechanisms such as a public key infrastructure (PKI) cannot be used.

Statistical objects are used where conventional secured communications of an original object, such as a PKI certificate, cannot be used due to protocol constraints or communications bandwidth limitations. Using statistical objects provide a substantial benefit which is not achievable by the prior art. Using a statistical object instead of an original object achieves much greater bandwidth efficiency due to the use of a deterministic statistical representation of the original object.

Statistical objects are used in systems that utilize non-interactive authentication, which do not require the authenticating system to provide any response until authentication has been completed.

Statistical Object Identification (SOI Parent) is described and claimed in U.S. Pat. No. 8,572,697, entitled Method for Statistical Object Identification. The text and drawings of U.S. Pat. No. 8,572,697 are hereby incorporated by reference.

Statistical Object Identification (SOI CIPA) is also described and claimed in U.S. patent application Ser. No. 13/987,747, entitled Method for Statistical Object Identification. The text and drawings of U.S. patent application Ser. No. 13/987,747 are hereby incorporated by reference.

Statistical Object Identification (SOI CIP B) is also described and claimed in U.S. patent application Ser. No. 14/998,645, entitled Method for Statistical Object Identification. The text and drawings of U.S. patent application Ser. No. 14/998,645 are hereby incorporated by reference.

The development of an apparatus and/or method that more securely and more efficiently generates statistical objects would constitute a major technological advance, and would satisfy long felt needs and aspirations in the cyber security industry.

SUMMARY OF THE INVENTION

One embodiment of the present invention uses a Deterministic Random Bit Generator (DRBG) Statistical Object Generator to generate a Statistical Object. In general, a Statistical Object is the deterministic statistical representation of an original object. A statistical representation is generally a digital string that is equivalent to another different digital value. A DRBG Statistical Object Generator has an initiator, an output, an initialization vector and an internal state. The output is used as the Statistical Object.

The present invention provides a new and novel method and apparatus for the generation of statistical objects that are compatible with previous systems that perform statistical object identification with greater computational efficiency and greater security.

The present invention provides apparatus and methods which are directed to a specific improvement in the way computers operate.

Previous statistical object generation methods use hashing systems to generate statistical objects. A hash, hashing function, or hashing system pertains to any procedure or mathematical method that converts a large amount of data into a smaller amount of data.

In a hash based system, the keying material associated with the original object used as input to the hash function must be present whenever a statistical object is generated. In the present invention, which uses a Deterministic Random Bit Generator (DRBG) mechanism, an internal state is maintained that requires that the associated keying material, called an initialization vector (IV), to be present only when a DRBG Statistical Object Generator is (re)initialized.

The term "internal state" generally refers to the initial condition or configuration of an element or combination of software and/or hardware. In one implementation, an "internal state" may be interpreted to mean the contents of a computer memory at a particular point in time which results from particular inputs and computer processing.

The term "keying material" generally refers to strings of bits which are used as cryptographic keys. Keying material is usually provided by a key management system which is responsible for the secure creation, distribution and expiration of the keys. The keying material may itself be encrypted to protect against eavesdropping during communication.

Furthermore, the use of multiple stages or systems of a DRBG Statistical Object Generator further reduces the possible exposure of an initialization vector thereby increasing the security of the system. The use of a system employing a DRBG device is more computationally efficient that using a hash based system. The term "exposure of an initialization vector" generally pertains to the risk of unauthorized copying or use of data or information. The term "computationally efficient" generally refers to improvements which enable fewer resources to obtain a given function or result.

The primary requirement for compatibility with previous Statistical Object Identification systems is that the statistical object generation output be deterministic, meaning that given the same initialization vector, two Statistical Object Identification systems will produce the same output. To insure secure operation, to an observer without access to the initialization vector, the output will appear to be random and unpredictable.

In one embodiment, two DRBG Statistical Object Generators generate a Statistical Object. A first DRBG Statistical Object Generator has a first initiator, a first output, a first initialization vector and a first internal state. The first output is used as the second initialization vector to the second DRBG Statistical Object Generator. The second DRBG Statistical Object Generator has a second initiator, a second output, a second initialization vector and a second internal state. The second output is used as the Statistical Object.

In general, this output (first, second or nth) is a string of bits. When the output is used as an initialization vector, a predefined number of consecutive bits is used. When the output is used as a statistical object, a predefined number of consecutive bits is used. Output bits used as an initialization vector or as a statistical object are used once and then discarded. A given output from a DRBG Statistical Object Generator is used only once.

A BRIEF DESCRIPTION OF THE DRAWINGS

Figure 9:
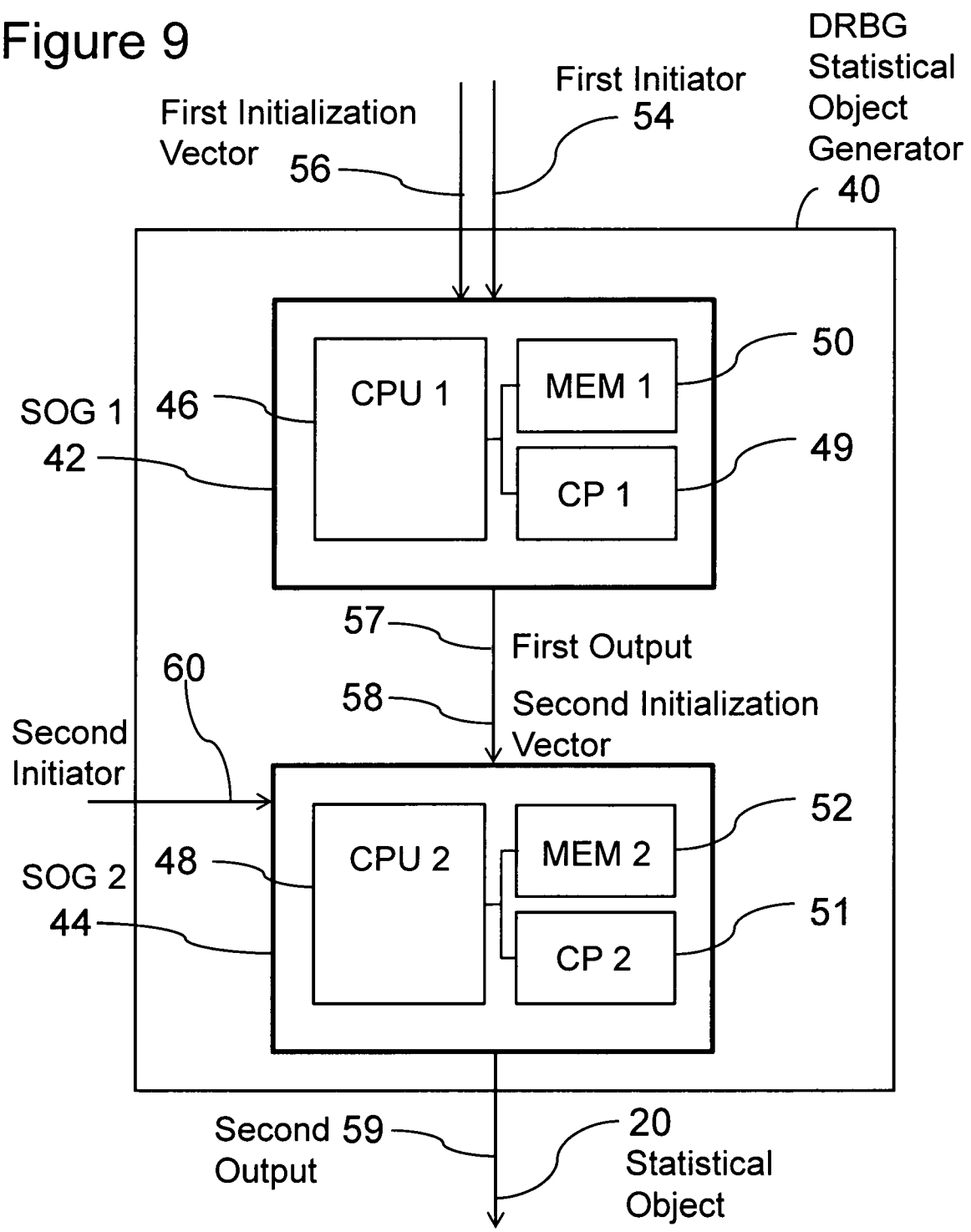
FIG. 9 is a schematic diagram of one embodiment apparatus that may be used to practice the present invention.
Figure 10:
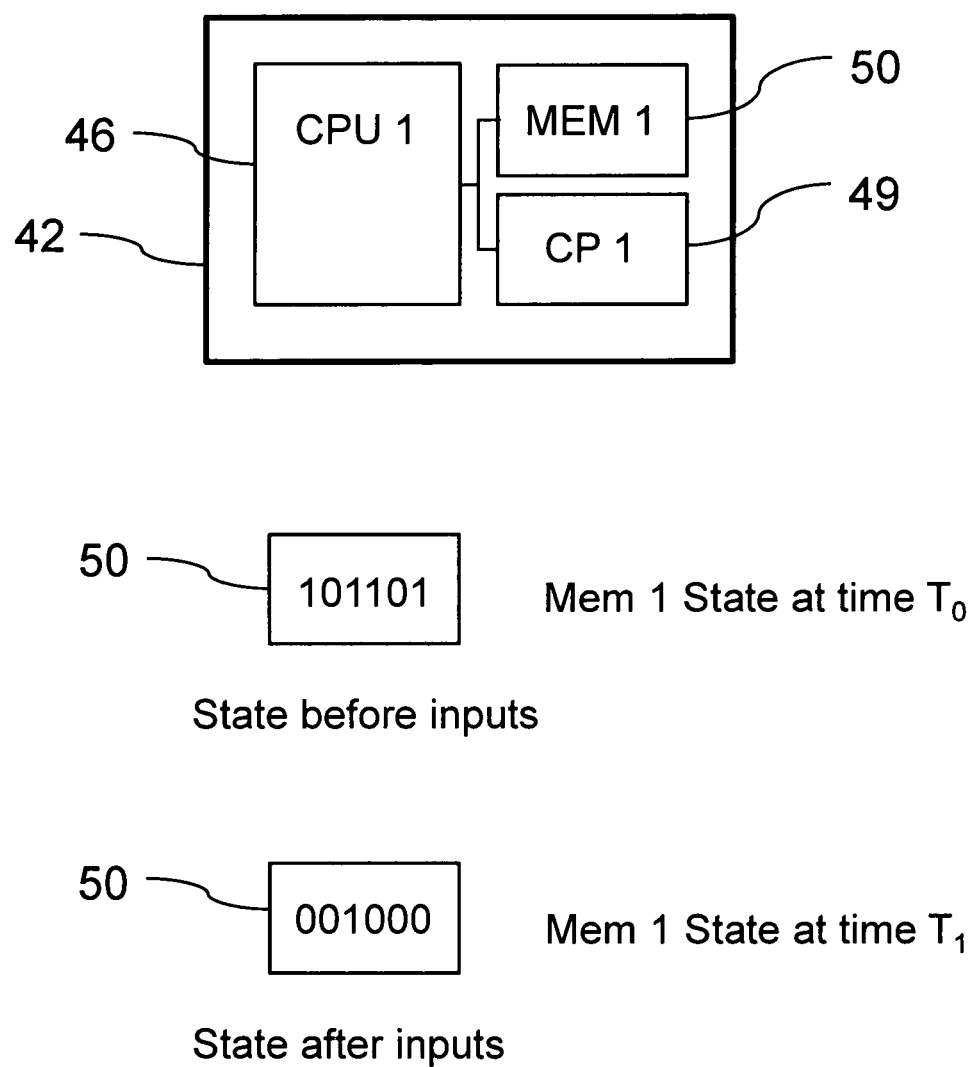
Figure 11:
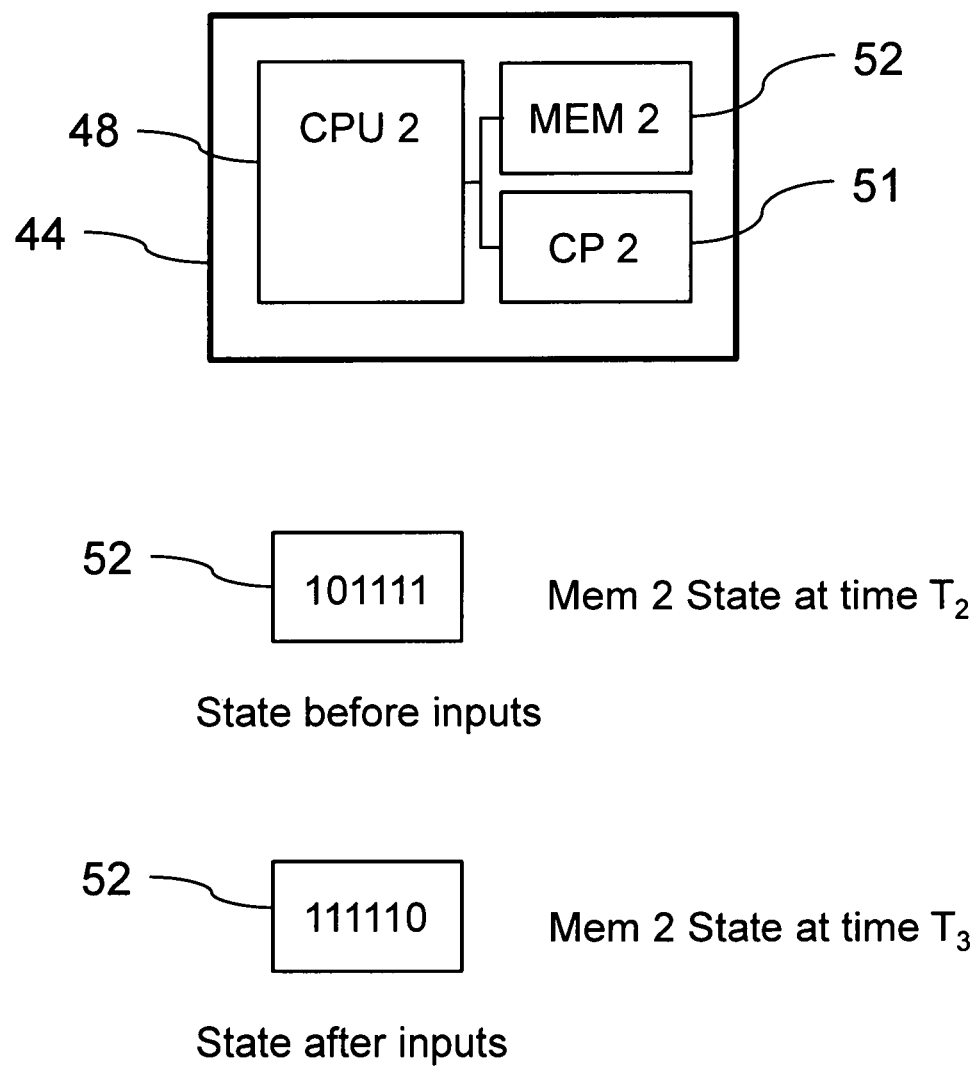

FIGS. 10 and 11 present schematic views of the changes of state which occur within the apparatus shown in FIG. 9.

Figure 12:
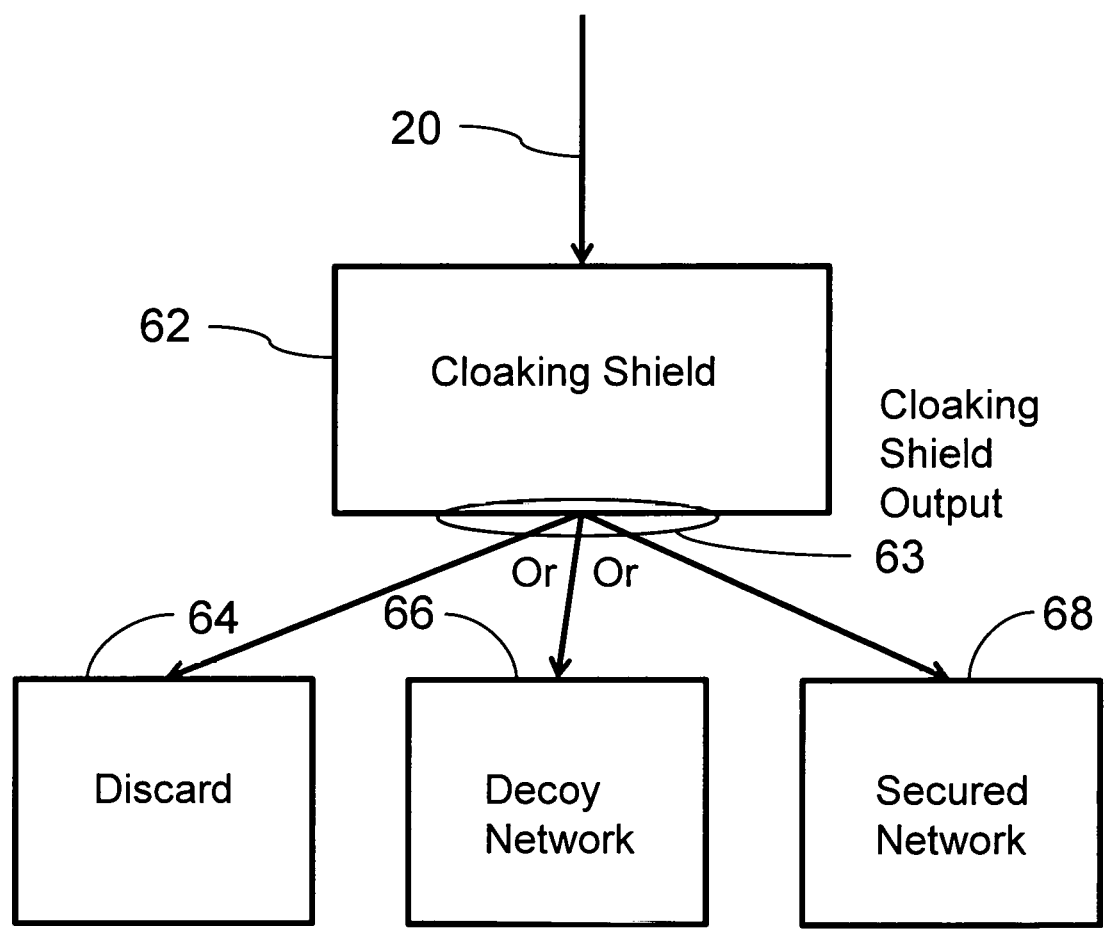

FIG. 12 is a schematic diagram which shows how the output of the apparatus shown in FIG. 9 is used to accomplish significant post-solution activity.

A DETAILED DESCRIPTION OF PREFERRED & ALTERNATIVE EMBODIMENTS

I. Background of the Invention

Earlier descriptions of Statistical Object Identification (SOI) and uses of SOI have used hashing to generate the statistical object. Hashing systems do not have an internal state that is preserved from one statistical object generation operation to the next, thus requiring that all original object material used by the hashing system be present during every statistical object generation event. In general, original object material is the information that is used to generate a statistical object. The original object material may include keying material, clock material or other metadata. The original object material must be securely handled to preserve the security integrity of the SOI system. The required presence of original object material at every SOI generation event makes this difficult.

Figure 1:
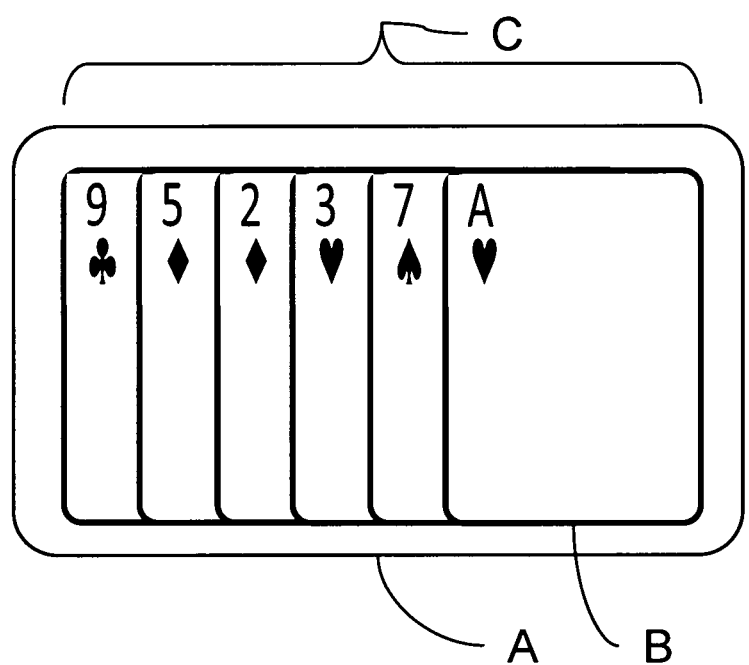
FIG. 1 is an illustration of the prior art showing a deck of 52 playing cards.
Figure 2:
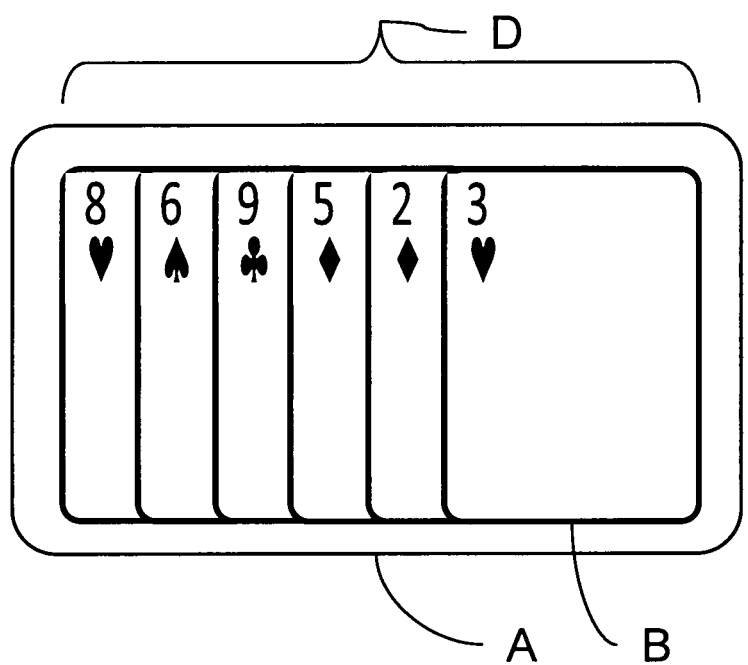
FIG. 2 is an illustration of the prior art showing a deck of cards after being cut.
Figure 3:
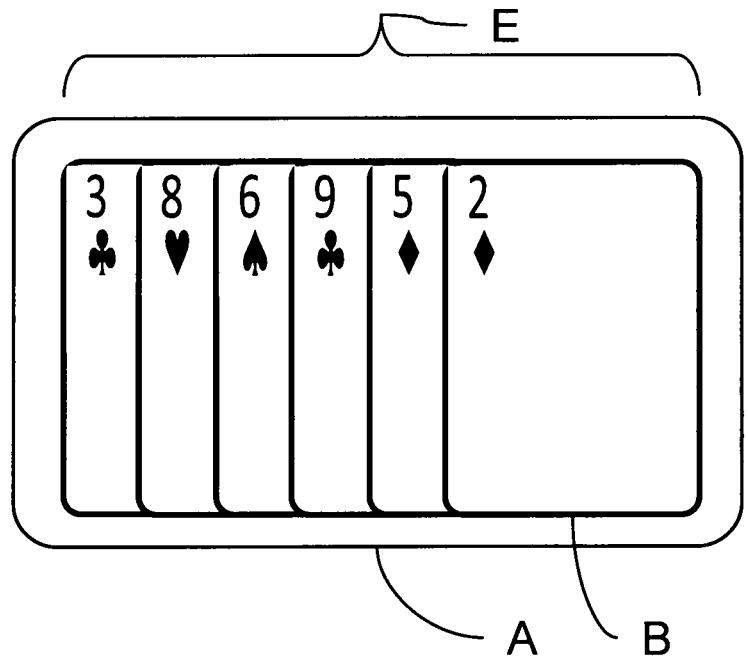
FIG. 3 is an illustration of the prior art showing a deck of playing cards after drawing a card.
Figure 3:
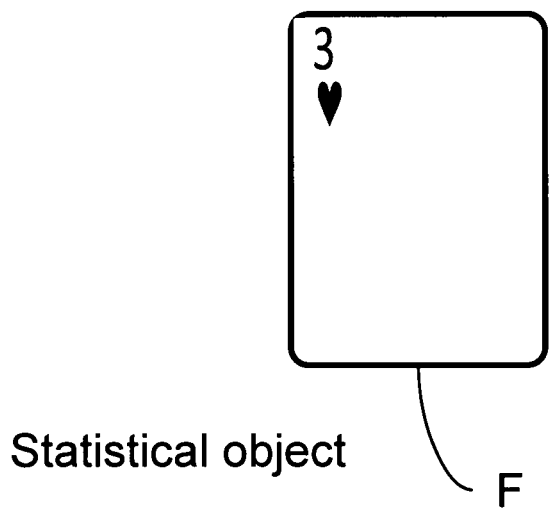

An analogy that helps to explain how a DRBG Statistical Object Generator operates is shown in FIGS. 1-3 and uses a deck of 52 playing cards.

FIG. 1 is an illustration of the prior art showing a deck of 52 playing cards A as an example of a DRBG Statistical Object Generator to illustrate initialization and internal state. The top card is the Ace of Spades B. The deck of cards is initialized to a predefined order of Ace of Hearts, Seven of Clubs, Three of Hearts, Two of Diamonds, Five of Diamonds, and Nine of Clubs C.

FIG. 2 is an illustration of the prior art showing a deck of cards A after being cut where the cut depth=2 cards. After initialization, the internal state is Three of Hearts, Two of Diamonds, Five of Diamonds, Nine of Clubs, Six of Spades and Eight of Hearts D, with the top card being the Three of Hearts B. The deck of cards A is now ready to generate a statistical object.

FIG. 3 is an illustration of the prior art showing a deck of playing cards A after drawing a card F. The drawn card is the Three of Hearts F which acts is the statistical object. The resulting internal state is Two of Diamonds, Five of Diamonds, Nine of Clubs, Six of Spades, Eight of Hearts and Three of Spades E.

II. Overview of the Invention

In a preferred embodiment of the invention, a statistical object, which is a deterministic statistical representation of an original object, is generated using a Deterministic Random Bit Generator (DRBG). Before the first statistical object can be generated, the DRBG Statistical Object Generator must be initialized with an initialization vector. The initialization vector should be unique to the original object with which it is associated. The initialization vector initializes the internal state. When requested via an initiator, the DRBG Statistical Object Generator produces an output. In general, an initiator is a user or a network component that initiates a communication or a connection to a network.

The present invention provides apparatus and methods which are directed to a specific improvement in existing technology, and in the way computers operate. The present invention offers apparatus and methods which are directed to a specific implementation of a solution to a problem in the software arts.

This output may be used directly as a statistical object or may be used as an initialization vector to another DRBG Statistical Object Generator. Subsequent requests for output do not require an initialization vector, the output is generated using the previously initialized internal state. Multiple DRBG Statistical Object Generators may be chained together to produce a statistical object. The last DRBG Statistical Object Generator in the chain will produce statistical objects upon request via its initiator. This last DRBG Statistical Object Generator may be periodically re-initialized by the next DRBG Statistical Object Generator up the chain and so on. Each DRBG Statistical Object Generator may be instantiated in a separate security context such that the compromise of one security configuration does not compromise another security configuration. Because of the cascade effect of using a chain of DRBG Statistical Object Generators, it is preferable that the DRBG Statistical Object Generators are arranged from most secure to least secure.

An analogy of a DRBG Statistical Object Generator is a standard deck of 52 playing cards in 4 suits, with 13 unique cards of each suit. The internal state is the order of the cards within the deck. The initialization vector is the original order of the cards followed by a cut of the deck as specified in the initialization vector. The cut of the deck is performed by being given a number that corresponds to the number of cards down into the deck to select and place cards below that card in the deck on top of those selected cards. The output is the top card drawn from the deck.

The present invention provides specific improvements to the way statistical objects are generated, resulting in increased security and increased computational efficiency during the statistical object generation process.

III. Definition of Terms

Authentication—Authentication is the act of confirming the truth of an attribute claimed true by an entity.

Deterministic Random Bit Generator (DRBG)—An RBG that includes a DRBG mechanism and (at least initially) has access to a source of entropy input. The DRBG produces a sequence of bits from a secret initial value called an initialization vector, along with other possible inputs. A DRBG is often called a Pseudorandom Number (or Bit) Generator.

Digital Identity—A digital representation of a set of characteristics by which a user, process or device is uniquely recognized.

Hash or Hashing function—Any procedure or mathematical method that converts a large amount of data into a smaller amount of data.

Initialization Vector—A secret initial value provided to a DRBG generator. The initialization vector is a string of bits of a predefined length. This string of bits may be represented as a digital value.

Interactive Authentication—An authentication process that requires the party performing authentication to send one or more communications to the party requesting authentication during the authentication process.

Network—A network is a collection of computers, servers, clients, routers and/or other devices that are connected together such that they can communicate with each other. The Internet is an example of a network.

Non-Deterministic Random Bit Generator (Non-deterministic RBG) (NRBG)—An RBG that produces outputs that have full entropy. Contrast with a DRBG.

Non-interactive Authentication—An authentication process that does not require the party performing authentication to send a communication to the party requesting authentication during the authentication process.

Original Object—An original object is a string of bits. An original object is associated with an initialization vector that generates a statistical object.

Protected Hardware—A hardware device with its own internal state that is isolated and protected from general purpose processor and memory resources.

Protected Processor—One or more processors that is isolated and protected from general purpose processors. A protected processor has its own memory or protected memory region.

Protected Memory—Part of computer memory that is accessible only by a privileged application operating on a general purpose processor.

Protocol—In the field of telecommunications, a protocol is the set of standard rules for data representation, signaling, authentication, error detection and other features required to send information over a communications channel. Not all protocols provide all of these features. Protocols with different features may be layered on top of one another to provide a more robust feature set. Examples of protocols are the IP protocol and the TCP protocol. These protocols are often used together and referred to as the TCP/IP protocol.

Protocol Entity—A device, function, process or procedure that implements a communications protocol.

Random Bit Generator (RBG)—A device that outputs a sequence of binary bits that appears to be statistically independent and unbiased. An RBG is either a DRBG or an NRBG.

Statistical Object—The output of a function or mechanism that has a statistical distribution.

Uniform Distribution—A uniform distribution is a distribution that has constant probability.

IV. Preferred and Alternative Embodiments of the Invention

Figure 4:
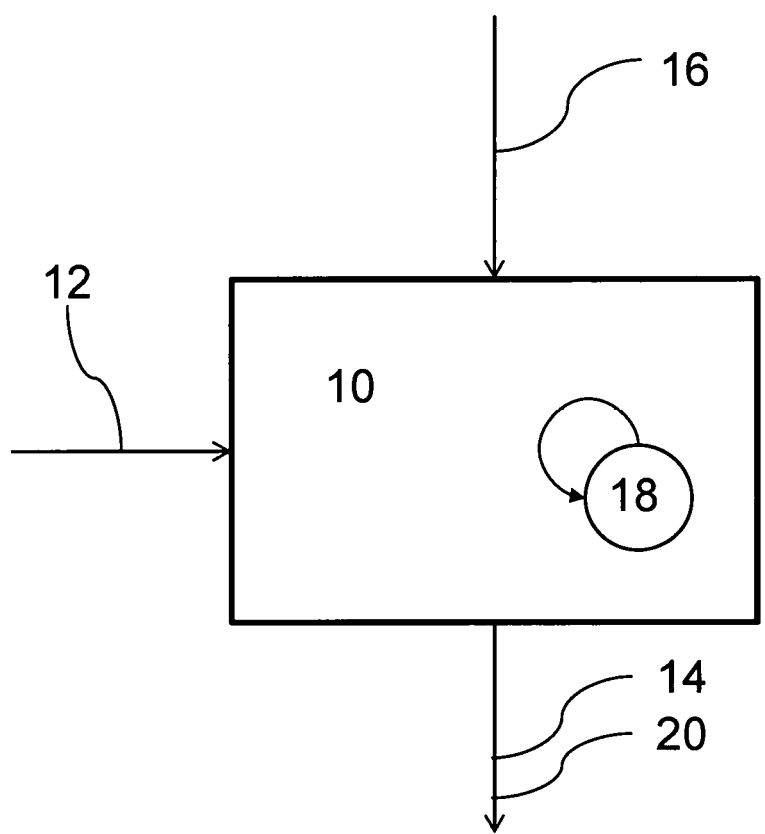
FIG. 4 is an illustration which shows an embodiment of the present invention using a DRBG Statistical Object Generator to generate a Statistical Object.

FIG. 4 is an illustration which shows an embodiment of the present invention using a DRBG Statistical Object Generator 10 to generate a Statistical Object 20. A DRBG Statistical Object Generator 10 has an initiator 12, an output 14, an initialization vector 16 and an internal state 18. The output 14 is used as the Statistical Object 20.

The output 14 is a string of bits. When the output 14 is used as a statistical object 20, a predefined number of consecutive bits is used. Output bits used as a statistical object 20 are used once and then discarded. A given output from a DRBG Statistical Object Generator is used only once.

Figure 5:
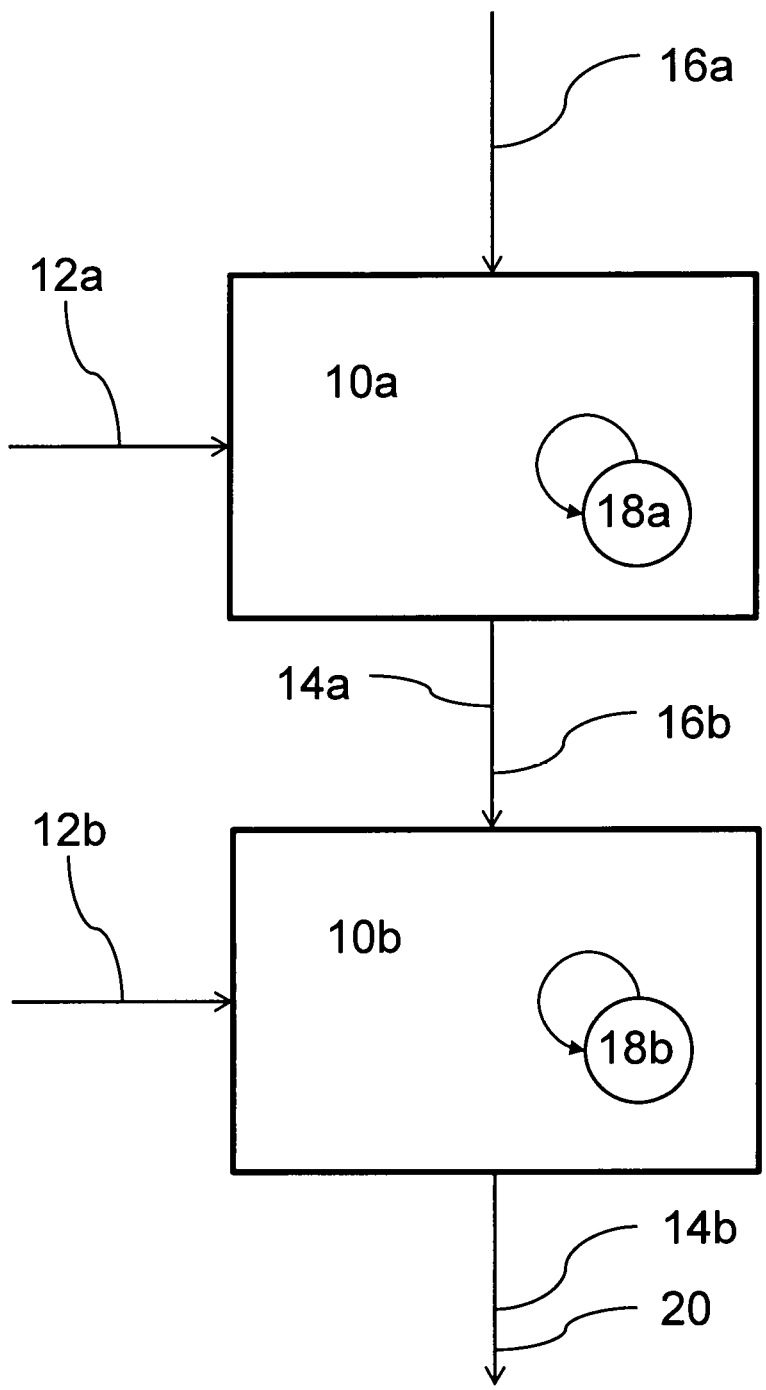
FIG. 5 is an illustration which shows an embodiment of the present invention using two DRBG Statistical Object Generators to generate a Statistical Object.

FIG. 5 is an illustration which shows one particular embodiment of the present invention using two DRBG Statistical Object Generators 10 to generate a Statistical Object 20. A first DRBG Statistical Object Generator 10a has a first initiator 12a, a first output 14a, a first initialization vector 16a and a first internal state 18a. The first output 14a is used as the second initialization vector 16b to the second DRBG Statistical Object Generator 10b. The second DRBG Statistical Object Generator 10b has a second initiator 12b, a second output 14b, a second initialization vector 16b and a second internal state 18b. The second output 14b is used as the Statistical Object 20.

Figure 6:
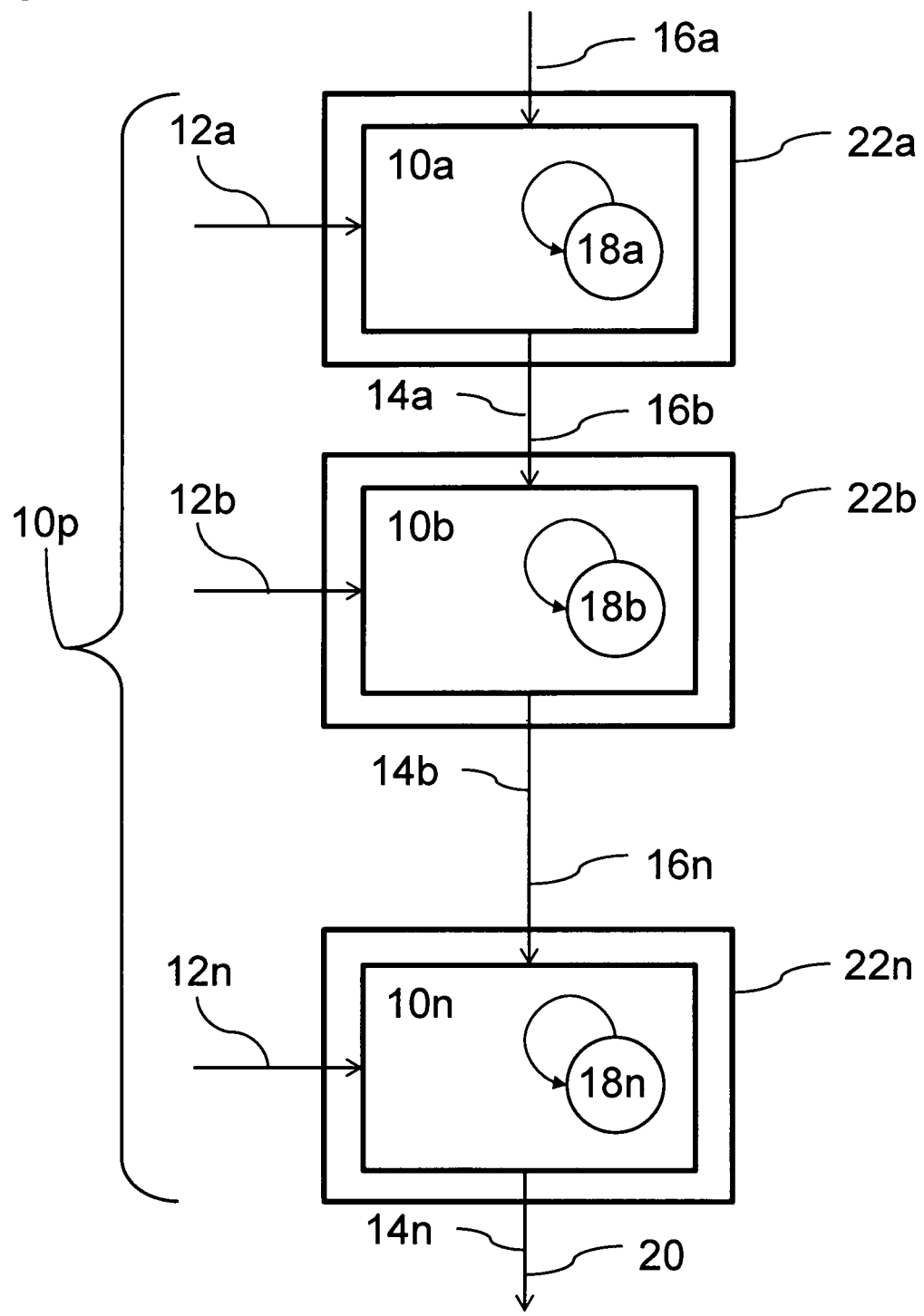
FIG. 6 is an illustration which shows an embodiment of the present invention using a plurality of DRBG Statistical Object Generators to generate a Statistical Object.

FIG. 6 is an illustration which shows an embodiment of the present invention using a plurality of DRBG Statistical Object Generators 10p to generate a Statistical Object 20. A first DRBG Statistical Object Generator 10a has a first initiator 12a, a first output 14a, a first initialization vector 16a, a first internal state 18a and a first security configuration 22a. The first output 14a is used as the second initialization vector 16b to the second DRBG Statistical Object Generator 10b. The second DRBG Statistical Object Generator 10b has a second initiator 12b, a second output 14b, a second initialization vector 16b, a second internal state 18b and a second security configuration 22b. The second output 14b is used as the initialization vector 16 to the next DRBG Statistical Object Generator 10 in the plurality of DRBG Statistical Object Generators 10p, and so on, until the output 14 from the next to last DRBG Statistical Object Generator 10 is used as the last initialization vector 16n to the last DRBG Statistical Object Generator 10n. The last DRBG Statistical Object Generator 10n has a last initiator 12n, a last output 14n, a last initialization vector 16n, a last internal state 18n and a last security configuration 22n. The last output 14n is used as the Statistical Object 20.

Figure 7:
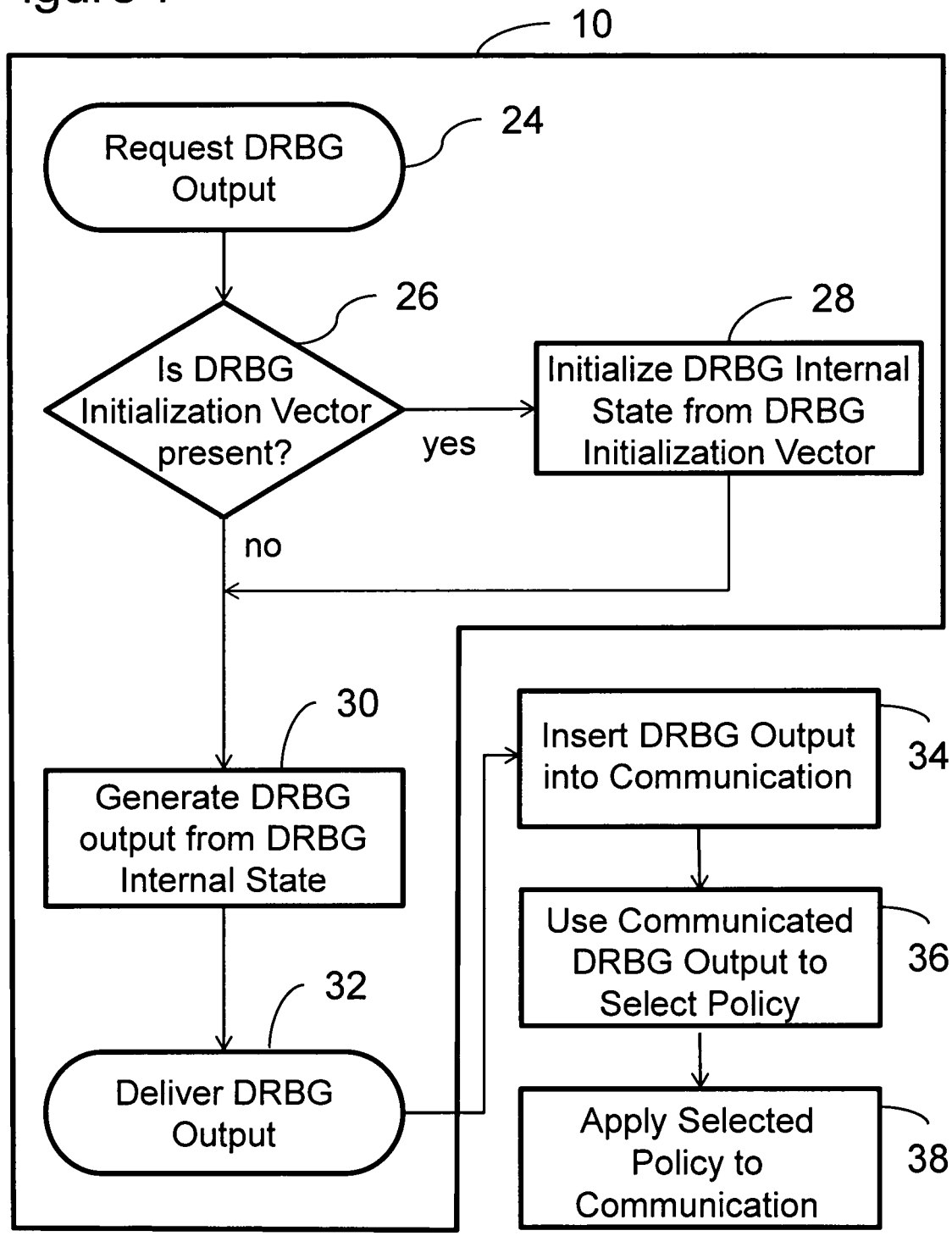
FIG. 7 is a flowchart describing the operation of a DRBG Statistical Object Generator.

FIG. 7 is a flowchart that describes the operation of one embodiment of a DRBG Statistical Object Generator 10. When an output from a DRBG Statistical Object Generator 10 is requested, in Flowchart 1, Step 1 24, a check is made to determine if an initialization vector is present in Flowchart 1, Step 2 26. If a initialization vector is present, then the internal state is initialized to the initialization vector in Flowchart 1, Step 3 28. After the internal state has been initialized or if no initialization vector is present, the output is generated using the internal state in Flowchart 1, Step 4 30. The output is delivered in Flowchart 1, Step 5 32.

Figure 8:
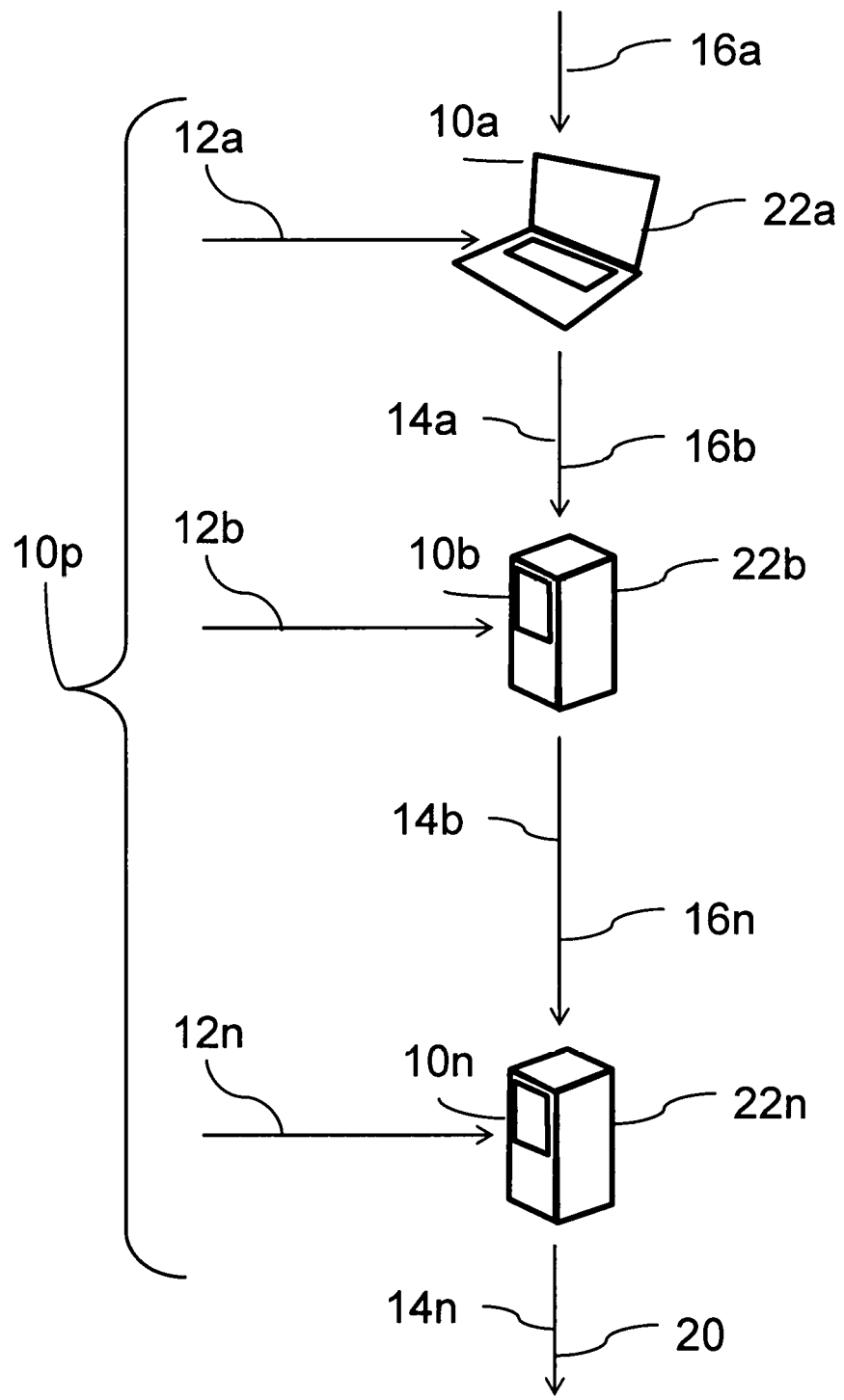
FIG. 8 is an illustration which shows an embodiment of the present invention using a plurality of DRBG Statistical Object Generators to generate a Statistical Object.

FIG. 8 is an illustration which shows one embodiment of the present invention, which uses a plurality independent computers as a plurality of of DRBG Statistical Object Generators 10p to generate a Statistical Object 20. A first DRBG Statistical Object Generator 10a has a first initiator 12a, a first output 14a, a first initialization vector 16a and a first security configuration 22a. The first output 14a is used as the second initialization vector 16b to the second DRBG Statistical Object Generator 10b. The second DRBG Statistical Object Generator 10b has a second initiator 12b, a second output 14b, a second initialization vector 16b, and a second security configuration 22b. The second output 14b is used as the initialization vector 16 to the next DRBG Statistical Object Generator 10 in the plurality of DRBG Statistical Object Generators 10p and so on until the output 14 from the next to last DRBG Statistical Object Generator 10 is used as the last initialization vector 16n to the last DRBG Statistical Object Generator 10n. The last DRBG Statistical Object Generator 10n has a last initiator 12n, a last output 14n, a last initialization vector 16n, and a last security configuration 22n. The last output 14n is used as the Statistical Object 20. The first internal state 18a, the second internal state 18b, and the last internal state 18n are present inside the first DRBG Statistical Object Generator 10a, the second DRBG Statistical Object Generator 10b and the last DRBG Statistical Object Generator 10n respectively, but not shown.

V. Methods of Operation for Statistical Object Identification

The present invention is designed to operate in multiple configurations, where different configurations may have different numbers of stages of DRBG Statistical Object Generators.

In FIG. 4, a single DRBG Statistical Object Generator 10 is employed. On the first use of the DRBG Statistical Object Generator 10, an initialization vector 16 must be present. The initialization vector 16 is used to initialize the internal state 18. The internal state 18 is then used to generate the output 14. The output 14 is used as the Statistical Object 20. Subsequent uses of the DRBG Statistical Object Generator 10 do not require that a initialization vector 16 is present. The DRBG Statistical Object Generator 10 will use the internal state 18 to generate the output 14 each time an output 14 is requested by the initiator 12. At any time, the DRBG Statistical Object Generator 10 can be re-initialized using a new initialization vector 18 to re-initialize the internal state 18.

In FIG. 5, two DRBG Statistical Object Generators 10a, 10b are illustrated. On the first use of the first DRBG Statistical Object Generator 10a, a first initialization vector 16a must be present. The first initialization vector 16a is used to initialize a first internal state 18a. The first internal state 18a is then used to generate a first output 14a. The first output 14a is used as the second initialization vector 16b. The second initialization vector 16b is used to initialize a second internal state 18b. The second internal state 18b is then used to generate a second output 14b. The second output 14b is used as the Statistical Object 20. Subsequent requests for Statistical Objects 20 are produced by activating the second initiator 12b. The second DRBG Statistical Object Generator 10b will use the second internal state 18b to generate a second output 14b which is subsequently used as the Statistical Object 20.

At any time, either DRBG Statistical Object Generator 10a, 10b can be re-initialized. A re-initialization of the second DRBG Statistical Object Generator 10b requires that the first DRBG Statistical Object Generator 10a generate another first output 14a. When only the second DRBG Statistical Object Generator 10b is being re-initialized, the first DRBG Statistical Object Generator 10a uses the first internal state 18a to generate a first output 14a which is used as the second initialization vector 16b to initialize the second internal state 18b. Once re-initialized, the second DRBG Statistical Object Generator 10b generates a second output 14b that is used as the Statistical Object 20.

A re-initialization of the first DRBG Statistical Object Generator 10a requires that a first initialization vector 16a be present. A first output 14a is generated as described above and is used as a second initiation vector 16b. A second output 14b is generated as described above and is used as the Statistical Object 20. The re-initialization of a prior DRBG Statistical Object Generator 10 will eventually cause all downstream DRBG Statistical Object Generators 10 to be re-initialized. The timing of the subsequent re-initializations will be determined by the implementation and the timing requirements of the overall system.

There are several activating events that may cause the re-initialization of a DRBG Statistical Object Generator 10. A timer may expire, a statistic may reach a threshold, or a new initialization vector 16 may be imposed upon the first DRBG Statistical Object Generator 10a by an external entity.

In FIG. 6, a plurality of DRBG Statistical Object Generators 10p are employed. On the first use of the first DRBG Statistical Object Generator 10a, a first DRBG initialization vector 16a must be present. The first initialization vector 16a is used to initialize a first internal state 18a. The first internal state 18a is then used to generate a first output 14a. The first output 14a is used as the second initialization vector 16b. The second initialization vector 16b is used to initialize a second internal state 18b. The second internal state 18b is then used to generate a second output 14b. The second output 14b is used as the initialization vector 16 for the next Statistical Object Generator 10 and so on. The last output 14n is used as the Statistical Object 20.

Subsequent requests for Statistical Objects 20 are produced by activating the last initiator 12n. The last DRBG Statistical Object Generator 10n will use the last internal state 18n to generate a last output 14n which is subsequently used as the Statistical Object 20.

At any time, any of the plurality of DRBG Statistical Object Generators 10p can be re-initialized. A re-initialization of any given DRBG Statistical Object Generator 10 requires that the prior DRBG Statistical Object Generator 10 generate another output 14 to be used as the initialization vector 16 for the given DRBG Statistical Object Generator 10. The re-initialization of a prior DRBG Statistical Object Generator 10 will eventually cause all downstream DRBG Statistical Object Generators 10 to be re-initialized. The timing of the subsequent re-initializations will be determined by the implementation and the timing requirements of the overall system.

Each of the plurality of DRBG Statistical Object Generators 10p may be instantiated in a separate security configuration 22. A security configuration 22 is an isolated environment in which a DRBG Statistical Object Generator 10 operates. Each security configuration 22 may be isolated such that the compromise of one security configuration 22 does not compromise the integrity of another security configuration 22. The Internal State 18 is local to each security configuration 22 and cannot be accessed from outside the security configuration 22. Example security configurations 22 are protected hardware, a protected processor and protected memory. In a preferred embodiment, when multiple security configurations 22 are employed, the security configurations should be arranged from most secure to least secure, with the first DRBG Statistical Object Generator 10a being instantiated in the most secure security configuration 22 and the last DRBG Statistical Object Generator 10n being instantiated in the least secure security configuration 22. Using the above example, protected hardware is the most secure, followed by a protected processor, followed by a processor using protected memory. A DRBG Statistical Object Generator 10 instantiated on a general purpose processor with no memory protection would be the least secure.

There are several activating events that may cause the re-initialization of a specific DRBG Statistical Object Generator 10. A timer may expire, a statistic may reach a threshold, or a new initialization vector 16 may be imposed upon the first DRBG Statistical Object Generator 10a by an external entity. In a preferred embodiment, a first DRBG Statistical Object Generator 10a generates a first output 14 that is used as the second initialization vector 16b in a second DRBG Statistical Object Generator 10b that is physically remote from the first DRBG Statistical Object Generator 10a. The second DRBG Statistical Object Generator 10b generates a second output 14b that is used as the third initialization vector 16 in a third DRBG Statistical Object Generator 10. The third DRBG Statistical Object Generator 10 generates a third output 14 that is used as the last initialization vector 16n in a last DRBG Statistical Object Generator 10n. The last DRBG Statistical Object Generator 10n generates a last output 14n which is used as the Statistical Object 20. A last output 14n is generated whenever it is requested by the last Initiator 12n. The third output 14 is generated periodically in accordance with a clock, causing the last DRBG Statistical Object Generator 10n to be periodically re-initialized. This enables the periodic resynchronization of DRBG Statistical Generators. The first output 14a is generated periodically to invalidate or re-instantiate an original object as needed. As shown above, this causes all downstream DRBG Statistical Object Generators 10 to be re-initialized.

When two instances of a DRBG Statistical Object Generator 10 are initialized using the same initialization vector, then the outputs 14 from each instance of the DRBG Statistical Object Generator 10 will also identical. This deterministic generation of outputs and their use as statistical objects enables statistical object generation to be performed independently in different locations and arrive at the same outputs.

VI. One Apparatus Embodiment of the Invention

A DRBG Statistical Object Generator

One embodiment of present invention is depicted in FIGS. 9, 10, 11 and 12. These four figures illustrate an embodiment of the invention that are implemented as an apparatus. The reference characters in these four figures generally refer to elements of apparatus.

FIG. 9 is a schematic diagram of an apparatus which may be used to implement and operate the present invention. In this embodiment, a DRBG Statistical Object Generator 40 includes a SOG1 42 and a SOG2 44.

Both SOG1 42 and SOG2 44 comprise three sub-components: a central processing unit (CPU1 46 & CPU2 48), a memory (MEM 1 50 & MEM2 52) and a control program (CP1 49 and CP2 51). The control programs 49 & 51 are loaded into the memories 50 & 52, and are run by the CPUs 46 and 48.

The control programs (49 & 51) comprise sets of instructions which direct a CPU to implement and operate the methods of the invention which is described in the Present Application. In one embodiment, the control programs (49 & 51) are written to memories (50 & 52) at the appropriate time. In one embodiment, the control programs (49 & 51) function is similar to a BIOS (a Basic Input/Output System, also known as a ROM BIOS). In other embodiments, the control programs (49 & 51) may be stored in other combinations of software, firmware, and/or hardware.

The control programs (49 & 51) regulate the operation of the central processing units (46 & 48), govern the processing of the inputs to the central processing units (46 & 48), and are responsible for the production of all outputs based on the inputs and this processing.

SOG1 42 is configured to receive two inputs: a first initiator 54 and a first initialization vector 56. These two inputs are processed by CPU1 46 in accordance with instructions embodied in control program CP1 49. In one embodiment of a control program, CP1 49 executing on CPU 1 46, the control program recognizes a first initiator 54 and causes the generation of a first output 57.

In general, an initiator is the triggering event that causes the output to be generated.

In general, an initialization vector is a secret initial value provided to a DRBG generator.

After these inputs are processed, MEM1 50 changes its state, and, as a direct consequence, CPU1 46 produces a first output 57.

This first output 57 is the product of SOG1 42 apparatus, and is fed to SOG2 44 as a second initialization vector 58. SOG2 44 is also configured to receive another input, a second initiator 60.

The two inputs, 58 & 60, are processed by CPU2 48 in accordance with instructions embodied in control program CP2 51.

After these inputs are processed, MEM2 52 changes its state, and, as a direct consequence, CPU2 48 produces a second output 59.

This second output 59 is the product of SOG2 44 apparatus. This second output 59 is a statistical object.

The changes of state that occur in the apparatus 42 and 44 are physical variations of digital values that are written to and stored in circuit elements.

Each memory 50 and 52 is capable of storing digital information. When a contents stored within a memory 50 or 52 changes, the memory, and, therefore, the Statistical Object Generator 40 changes state. This state is a particular, measurable collective condition or operating function of the Statistical Object Generator 40 at any particular point in time. This change of state is then used to produce a valuable output. The valuable output is used to produce a Statistical Object.

FIG. 10 is a schematic diagram which shows SOG1 42 and the status of MEM 1 50 before and after the state change.

As a simple example, which is employed only to fully explain the operation of this embodiment, the contents of MEM1 50 are shown before and after the receipt of inputs

54 & 56. At an arbitrary time, shown as T0, the contents of MEM1 50 are illustrated as the digital string "101101". At a time later than T0, shown as T1, the contents of MEM1 50 are illustrated as the digital string "001000". These two different digital strings indicate the change of state of MEM1 50.

FIG. 11 is a schematic diagram which shows SOG2 44 and the status of MEM 2 52 before and after the state change.

As a simple example, which is employed only to fully explain the operation of this embodiment, the contents of MEM2 52 are shown before and after the receipt of inputs 57 & 58. At an arbitrary time, shown as T2, the contents of MEM2 52 are illustrated as the digital string "101111". At time later than T2, shown as T3, the contents of MEM2 52 are illustrated as the digital string "111110". These two different digital strings indicate the change of state of MEM2 52.

In one embodiment, the Statistical Object is used to enhance the security of a network. Specifically, this significant post-solution activity thwarts access to a network by unauthorized users 12.

VII. Significant Post-Solution Activity: Using SOG for SOI Secured Networks

FIG. 12 is a schematic diagram which illustrates one particular embodiment of apparatus that is utilized to practice the present invention. An output 20 is fed to a cloaking shield 62. The cloaking shield 62 directs a cloaking shield output 63 based on the properties of the statistical object received by the cloaking shield 62. These properties may include the identity associated with the statistical object, security information associated with the statistical object, geolocation information associated with the statistical object or other metadata associated with the statistical object. In one embodiment of the invention, the cloaking shield 62 is a combination of methods and/or apparatus that uses Statistical Objects to grant access to trusted users of a secured network.

The cloaking shield 62 is a computer security device that uses statistical objects 20 received as part of a communication to determine how to process the received communications. Statistical objects 20 are designed to be secure even when communicated over an insecure communications network and enable a cloaking shield 62, based on the properties communicated to the cloaking shield 62, to allow access to the resource indicated in the communication, deny access to the resource indicated in the communication and provide no response to the sender of the communication, or redirect the communication to an alternate resource.

The cloaking shield output 63 is then either discarded 64, or directed to a decoy network 66, or is directed to a secured network 68. The identification of the validity of the output by the cloaking shield apparatus 62 protects the secured network 68 from unauthorized access by malicious users.

The Present Application is related to U.S. Pat. No. 8,572, 697, entitled Method for Statistical Object Identification. This Patent Grant contains text that explains the significant post-solution activity associated with one implementation of the Present Invention:

"A statistical object, the deterministic statistical representation of an original object, may be generally considered to be the output of a hash or similar function coupled with additional inputs of clocks, counters and other varying deterministic inputs. Unambiguously identifying a statistical object to a unique original object is essentially an exercise in mitigating the effects of the birthday problem. The birthday problem is the probability that output of the hash of different original objects and their deterministic inputs produce identical statistical objects. The generation of a single statistical object by two or more original objects causes a collision. Given a uniform distribution, the probability of a collision increases with the number of statistical objects in use. Statistical objects are designed to be used as components of security devices. As a component to security devices, in additional to uniquely identifying a statistical object back to the original object, the overall probability of guessing any valid statistical object must also be considered. The amount of space available to carry a statistical object will vary with the communications mechanism, but the size of an individual statistical object is expected to remain small, generally less than the number of bits required to uniquely identify an original object when large numbers of objects are in use. This requires the aggregation of two or more related statistical objects into a larger aggregate statistical object. Aggregating multiple related statistical objects into a single aggregate statistical object requires that all possible original object resolution matches are tracked and maintained. Multiple statistical objects from the same original object can be associated together by using information associated with the communication and reception of the statistical objects. This information, called communications characteristics, can include networking information, such as the source address or network session information including source and destination addresses and source and destination port numbers. Communications characteristics can also include physical information such as the physical port upon which the statistical object was received or the logical channel upon which the statistical object was received.

To unambiguously identify the original object from which a statistical object or a stream of statistical objects was generated, the device performing the identity must maintain a table of all valid statistical objects. This table may contain collisions where multiple original objects generate the same statistical object. When a statistical object is received, it is first looked up in the table of all statistical objects to determine if the received statistical object is valid. If the received statistical object is not found in the table, then no further processing occurs with respect to identifying the original object on that reception. When a statistical object is received and is matched in the table of all valid statistical objects, the communications characteristics associated with the reception of the statistical object and the list of all potential original objects are recorded. If the list of potential original objects has exactly a single entry, then the original object is identified and the process moves on to calculating the statistical probability.

When a statistical object is received and is not unambiguously identified, the partially identified statistical object and the list of potential original objects are recorded along with the communications characteristics associated with the reception of the statistical object. When a another statistical object with related communications characteristics is received, the list of potential original objects is pruned of original objects that cannot generate the complete set of received statistical objects found in the aggregate statistical object. Once the original object is unambiguously identified, the process moves on to calculating the statistical probability of guessing the information in the aggregate statistical object. If the original object is not unambiguously identified, nothing further is done at this time and the system awaits the reception of another statistical object with related communications characteristics to increase the number of bits of information received and again aggregates this information into the aggregate statistical object and the process repeats itself.

Calculating the probability of guessing the information in the aggregate statistical object requires the number of bits of statistical objects that have been received and aggregated and the number of statistical objects maintained in the table of all valid statistical objects. The specific probability p of a collision is $$p(n;d) = \frac{d!}{d^n(d-n)!}$$

where n is the number of statistical objects in the table of valid statistical objects and d is the total number of unique statistical objects available. For general use, the approximation $$p(n;d) \approx 1 - e^{-n^2/(2 \times d)}$$

is used. The total number of unique statistical objects available $$d \text{ is } d=2^b$$

where b is the number of bits of statistical object information received.

Once the probability has been calculated, it is compared against the probability threshold. If the calculated probability is less than the probability threshold, then the statistical object has been identified with a confidence that the aggregate information received does not exceed the probability threshold set beforehand. If the probability-exceed the threshold, nothing further is done and the system awaits the reception of another statistical object with related communications characteristics to increase the number of bits of information received and aggregates into the aggregate statistical object and the progress repeats itself.

A further optimization can be made by associating communications characteristics across multiple identifications of statistical objects. When a statistical object is identified and does not exceed the probability threshold, thereby confirming that it was generated from the original object, the communications characteristics are temporarily associated with that original object. When a subsequent statistical object with similar or identical communications characteristics is received, the received statistical object is checked against the associated original object. If the associated original object could produce the received statistical object, the statistical object is identified as being produced by the associated original object. When multiple original objects are associated with the same set of communications characteristics, the identification of the statistical object proceeds by aggregating the statistical object information and pruning the list of potential original objects until only a single original object remains. The statistical object is still aggregated in an aggregated statistical object to enable the aggregation of information for the probability calculation. The probability calculation is made using the number of bits of information received in the aggregate statistical object and the number of statistical objects that are associated with the communications characteristics that are associated with the original object. This results in a lesser amount of statistical object information being required to not exceed the probability threshold, because the communications criteria is being used as an additional descriminator. Multiple sets of communications characteristics can be associated original object and multiple original objects can be associated with a single set of communications characteristics. When a statistical object is identified as being produced by an original object, a timestamp or other mechanism for indicating recent activity is updated in the communications characteristics associated with the original object. The lack of communications characteristics associated with original objects after a period of time should have their association removed after such periods of inactivity exceed a threshold. Subsequent statistical object reception with those removed communications characteristics will proceed as unassociated communications until those communications are again associated with an original object.

To insure the security of the statistical objects being produced cannot be readily captured, copied and replayed as original, the algorithms used to generate the statistical objects uses additional information in addition to the original object as inputs. This additional information may include clocks, counters and other deterministic inputs. During the identification of a statistical object back to an original object, this additional information is also identified and used to further validate the identity of the original object.

The probability threshold has several unique uses. Firstly, the use of a probability threshold enables the system for statistical object identity to be used with varying numbers of statistical objects contained within the table of all valid statistical objects without having the probability of guessing a statistical object increase as statistical objects are added to the valid statistical object table. The system employed here simply requires additional statistical objects, thus increasing the amount of information available to maintain the desired probability. The second unique attribute of using the probability threshold is that the probability threshold can be changed by the entity performing statistical object identification without communication, knowledge or coordination of the change by the entity generating the statistical object. This is especially important in the context of cyber security where knowledge of a threat or attack may raise the level of security desired. This can be used by the entity receiving and performing statistical object identification to decrease the threshold, requiring more statistical information before the original object identity is confirmed. The ability to perform this function without requiring any communication or notification to the entity producing the statistical object is especially useful and novel.

Additional information can also be conveyed using statistical objects. When additional inputs are used in the generation of the statistical object, this information can be extracted during the statistical object identification process. Examples of such additional information includes, but is not limited to, information regarding the state of some system or process, an index into a table of information or other types of data.

Statistical Object Identification (SOI CIPA & B) is also described in U.S. patent application Ser. Nos. 13/987,747 and 14/998,645, both entitled Method for Statistical Object Identification.

VIII. Apparatus for Statistical Object Identification

The apparatus that performs DRBG Statistical Object Generation is varied and diverse. It ranges from a simple, single function device that generates statistical objects to apparatuses that will be a module or subsystem within a larger system. This module may take the form of a state machine in an application specific integrated circuit (ASIC) or other form of integrated circuit or semiconductor implementation. This module may also take the form of logic coding provided to a programmable logic device such as a field programmable gate array (FPGA), programmable array logic (PAL) and other forms of programmable logic. This module may also take the form of instructions for a microprocessor. This module may also take the form of instructions to a synthetic or virtual processor or machine.

A DRBG Statistical Object Generator may be constructed using conventional computer architecture components, including one or more processors, memory, storage and input/output systems. For some security configurations, specialized devices and components may be used to provide protected hardware, protected processors and protected memory. Each of these protected system components add to the overall system security through their inherent physical security.

The apparatus that performs DRBG Statistical Object Generation may be used in communications devices, security devices, network routing devices, application routing devices, service delivery devices and other devices that are enabled by the addition of the efficient communication of an original object through the reception of a statistical object which is identified as being generated from an original object.

IX. Examples

One specific, simplified example of the present invention is disclosed in this Section of the Specification. The following example offers a description of a statistical object generator 10 and its corresponding output 14, initialization vector 16 and internal state 18 as illustrated using a standard deck of 52 playing cards.

A standard deck of 52 playing cards A in 4 suits, with 13 unique cards of each suit can be viewed as a simple statistical object generator 10. The internal state 18 is the order of the cards within the deck A. The initialization vector 16 is a predefined order C of the cards followed by a cut D of the deck as specified in the initialization vector. The cut of the deck is performed by being given a number that corresponds to the number of cards down into the deck to select and place cards below that card in the deck on top of those selected cards. The output 14 is the top card F of the deck.

When used for Statistical Object Identification, DRBG Statistical Object Generators are deployed at multiple locations requiring a minimum of two generator deployments; an insertion DRBG statistical object generator is used to generate the statistical object and insert the statistical object into a communication. A recognition DRBG Statistical Object generator is used to recognize the statistical object generated by the insertion statistical object generator in the communication. Furthermore, each of the insertion and recognition DRBG Statistical Object generators may be composed of multiple DRBG Statistical Object Generators.

Because multiple deployments are required, the initialization vector must be identical for each deployment. With our playing card example, each deck (insertion, recognition) must have their cards in the identical order to function.

Once the deck A, the DRBG Statistical Object generator 10, has been initialized, when a statistical object 20 is requested, the top card B is selected. This card is the statistical object F. For this example, once a card is drawn, it is discarded. When a certain number of cards has been drawn, for example 26, the deck A must be reinitialized. This is an example of the initiator 12 being activated by a statistic. If a card has not been drawn for a period of time, for example 2 minutes, the deck A must be reinitialized. This is an example of the DRBG initiator 12 being activated by a time event.

Within each insertion and recognition DRBG Statistical Object Generator deployments, multiple decks A may be used with each deployment. For example, if each DRBG Statistical Object Generator deployment uses three decks A, each deck A is independently initialized, with the first deck being acting as a first DRBG Statistical Object Generator 10a, being initialized by a first initialization vector 16a and subsequently generating a first output 14a. A second deck of cards A, acting as the second DRBG Statistical Object Generator 10b, using the first output 14a as the second initialization vector 16b. Here the second deck of cards A begins in a predefined order and is then cut based on the card provided by the first deck of cards. For example, if the first card from the first deck is a 7, then the second deck is cut 7 cards down. Once the second deck has been cut, the top card is the statistical object 20. For this example, once a card is drawn, it is discarded. This is an example of a plurality of DRBG Statistical Object Generators 10p producing a statistical object 20.

When a certain number of cards has been drawn from the second deck, for example 26, the deck must be reinitialized by drawing a card from the first deck, resetting the second deck to a predefined order and then cutting the second deck based again on the new card drawn from the first deck. This is an example of the initiator 12b being activated by a statistic. If a card has not been drawn for a period of time, for example 2 minutes, the deck must be reinitialized. This is an example of the initiator 12b being activated by a time event.

If each of the decks is held by a different person, each of the persons could represent a different security configuration. For example, if there are three decks of cards being used to generate a statistical object 20, deck one 10a may be held by Steve, deck two 10b may be held by Mike and deck three 10c may be held by Ann. Ann holds deck three 10c because she handles requests for statistical objects 20. Deck two 10b is held by Mike who periodically gives Ann an new initialization vector when Ann uses all of the cards she can from her deck or because it is time to reinitialize Ann's deck. Deck one 10a is held by Steve, locked upstairs in Steve's office. Steve uses deck one at shift change every four hours and gives the initialization vector to Mike. Each of Steve, Mike and Ann represent a different security configuration.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for statistical object identity that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

Background of the Invention

A Deck of 52 playing cards
B Top card
C Deck at initialization before cut, top 6 cards showing
D Deck internal state after initialization, cut=2, top 6 cards showing
E Deck internal state after drawing 1 card
F Statistical Object

Method Embodiment of the Invention

10 DRBG Statistical Object Generator
10a First DRBG Statistical Object Generator
10b Second DRBG Statistical Object Generator
10n Last DRBG Statistical Object Generator
10p Plurality of DRBG Statistical Object Generators
12 Initiator
12a First initiator
12b Second initiator
12n Last initiator
14 Output
14a First output
14b Second output
14n Last output
16 Initialization vector
16a First initialization vector
16b Second initialization vector
16n Last initialization vector
18 Internal state
18a First internal state
18b Second internal state
18n Last internal state
20 Statistical Object
22 Security configuration
22a First security configuration
22b Second security configuration
22n Last security configuration
24 Flowchart 1, Step 1
26 Flowchart 1, Step 2
28 Flowchart 1, Step 3
30 Flowchart 1, Step 4
32 Flowchart 1, Step 5
34 Flowchart 1, Step 6
36 Flowchart 1, Step 7
38 Flowchart 1, Step 8

Apparatus Embodiment of the Invention

40 DRBG Statistical Object Generator
42 SOG1
44 SOG2
46 CPU1
48 CPU2
50 MEM1
52 MEM2
54 First initiator
56 First initialization
57 First output
58 First initialization vector
60 Second initiator
62 Cloaking shield
63 Cloaking shield output
64 Discard
66 Route to decoy network
68 Forward to secure network

What is claimed is:

1. An apparatus comprising:
a Deterministic Random Bit Generator Statistical Object Generator (10) having an initiator (12) for requesting an output (14);
said Deterministic Random Bit Generator Statistical Object Generator (10) for receiving an initialization vector (16);
said Deterministic Random Bit Generator Statistical Object Generator (10) for producing said output (14) which is used as a statistical object (20);
said Deterministic Random Bit Generator Statistical Object Generator (10) being characterized by an internal state (18) for producing said output (14);
said initialization vector (16) for changing said internal state (18);
said output (14) also for changing said internal state (18);
a second Deterministic Random Bit Generator Statistical Object Generator (10b) having a second initiator (12b) for requesting a second output (14b);
said second Deterministic Random Bit Generator Statistical Object Generator (10b) for receiving a second initialization vector (16b) of said output (14) from said Deterministic Random Bit Generator Statistical Object Generator (10);
said second Deterministic Random Bit Generator Statistical Object Generator (10b) for producing said second output (14b) which is used as a statistical object (20);
said second Deterministic Random Bit Generator Statistical Object Generator (10b) being characterized by a second internal state (18b) for producing said second output (14b);
said second initialization vector (16b) for changing said second internal state (18b); and
said second output (14b) also for changing said second internal state (18b).

2. The apparatus as recited in claim 1, in which:
said output (14) is deterministic.

3. The apparatus as recited in claim 1, in which:
said initiator (12) is activated by a statistic.

4. The apparatus as recited in claim 1, in which:
said initiator (12) is activated by a time event.

5. The apparatus as recited in claim 1, in which:
said initiator (12) is activated when initialization information is received via said initialization vector (16).

6. The apparatus as recited in claim 1, in which:
said initiator (12) is activated to generate said statistical object (20).

7. The apparatus as recited in claim 1, in which:
said initialization vector (16) is associated with an original object.

8. A method comprising the steps of:
providing a Deterministic Random Bit Generator Statistical Object Generator (10);
said Deterministic Random Bit Generator Statistical Object Generator (10) having an initiator (12);
said Deterministic Random Bit Generator Statistical Object Generator (10) being characterized by an internal state (18):
said initiator (12) requesting an output (14);
generating said output (14) using said internal state (18);
updating said internal state (18) with said output (14);
providing a second Deterministic Random Bit Generator Statistical Object Generator (10b);

said second Deterministic Random Bit Generator Statistical Object Generator (10*b*) having a second initiator (12*b*);

said second Deterministic Random Bit Generator Statistical Object Generator (10*b*) being characterized by a second internal state (18*b*);

using said output (14) as a second initialization vector (16*b*);

supplying said second initialization vector (16*b*) to said Deterministic Random Bit Generator Statistical Object Generator (10*b*); and changing said second internal state (18*b*) within said second Deterministic Random Bit Generator Statistical Object Generator (10*b*) by processing said second initialization vector (16*b*).

9. A method comprising the steps of:

providing a Deterministic Random Bit Generator Statistical Object Generator (10);

said Deterministic Random Bit Generator Statistical Object Generator (10) having an initiator (12);

said Deterministic Random Bit Generator Statistical Object Generator (10) being characterized by an internal state (18):

said initiator (12) requesting an output (14);

generating said output (14) using said internal state (18); and updating said internal state (18) with said output (14), providing a second Deterministic Random Bit Generator Statistical Object Generator (10*b*);

said second Deterministic Random Bit Generator Statistical Object Generator (10*b*) having a second initiator (12*b*);

said second DRBG Deterministic Random Bit Generator Statistical Object Generator (10*b*) being characterized by a second internal state (18*b*);

said second initiator (12*b*) requesting a second output (14*b*);

generating said second output (14*b*) using said second internal state (18*b*);

updating said second internal state (18*b*) with said second output (14*b*); and using said second output (14*b*) as a statistical object (20).

* * * * *